United States Patent
Taniguchi et al.

(10) Patent No.: US 6,741,067 B2
(45) Date of Patent: May 25, 2004

(54) POWER GENERATION CONTROLLER AND METHOD FOR A VEHICLE

(75) Inventors: Makoto Taniguchi, Kariya (JP); Koji Tanaka, Anjo (JP); Tomoya Okuno, Nishio (JP)

(73) Assignee: Denso Corporation, Kariya (JP)

( * ) Notice: Subject to any disclaimer, the term of this patent is extended or adjusted under 35 U.S.C. 154(b) by 13 days.

(21) Appl. No.: 10/004,820

(22) Filed: Dec. 7, 2001

(65) Prior Publication Data

US 2002/0089312 A1 Jul. 11, 2002

(30) Foreign Application Priority Data

Jan. 9, 2001 (JP) ......................................... 2001-001492

(51) Int. Cl.⁷ ........................... H02H 7/06; H02P 11/00; H02P 9/00; H02P 9/40; H02P 9/14
(52) U.S. Cl. .............................. 322/28; 322/17; 322/36; 322/44; 322/45; 322/97
(58) Field of Search .............................. 322/17, 28, 36, 322/44, 45, 97

(56) References Cited

U.S. PATENT DOCUMENTS

| | | | | |
|---|---|---|---|---|
| 558,172 A | * | 4/1896 | Hayball .......................... 401/39 |
| 3,469,168 A | | 9/1969 | Harland, Jr. et al. ........ 320/123 |
| 3,577,050 A | * | 5/1971 | Ringland et al. ............. 318/146 |
| 3,584,276 A | * | 6/1971 | Ringland et al. ............. 318/721 |
| 3,720,863 A | * | 3/1973 | Ringland et al. ............... 318/52 |
| 3,845,372 A | * | 10/1974 | Ringland et al. ............ 318/779 |
| 4,641,075 A | * | 2/1987 | Asano et al. ................ 318/811 |
| 4,910,450 A | * | 3/1990 | Parker et al. ............... 318/811 |
| 5,177,677 A | * | 1/1993 | Nakata et al. .................. 363/89 |
| 5,182,511 A | | 1/1993 | Pierret et al. ......... 324/158 MG |
| 5,418,401 A | * | 5/1995 | Kaneyuki .................... 307/10.1 |
| 5,508,601 A | * | 4/1996 | Good et al. .................... 322/37 |
| 5,543,703 A | * | 8/1996 | Kusase et al. ................. 322/16 |
| 5,549,984 A | * | 8/1996 | Dougherty .................... 429/61 |
| 5,550,457 A | * | 8/1996 | Kusase et al. ................. 322/29 |
| 5,561,363 A | * | 10/1996 | Mashino et al. ............... 322/25 |
| 5,602,470 A | | 2/1997 | Kohl et al. .................. 324/177 |
| 5,606,244 A | * | 2/1997 | Migdal ............................ 322/7 |
| 5,719,484 A | * | 2/1998 | Taniguchi et al. ............. 322/20 |
| 5,726,559 A | * | 3/1998 | Taniguchi et al. ............. 322/34 |
| 5,739,677 A | * | 4/1998 | Tsutsui et al. ................. 322/25 |
| 5,986,439 A | | 11/1999 | Pletta et al. .................... 322/59 |
| 6,023,137 A | * | 2/2000 | Kumar et al. ................ 318/254 |
| 6,184,661 B1 | * | 2/2001 | Becker et al. ................. 322/25 |

(List continued on next page.)

FOREIGN PATENT DOCUMENTS

| | | |
|---|---|---|
| GB | 2100076 A | 12/1982 |
| JP | 62-44698 U | 3/1987 |

OTHER PUBLICATIONS

U.S. patent application Ser. No. 09/922,690, Ogino et al., filed Aug. 7, 2001.
U.S. patent application Ser. No. 09/978,537, Taniguchi et al., filed Oct. 18, 2001.
U.S. patent application Ser. No. 09/891,222, Takahashi et al., filed Jun. 26, 2001.

*Primary Examiner*—Burton S. Mullins
*Assistant Examiner*—Pedro J. Cuevas
(74) *Attorney, Agent, or Firm*—Oliff & Berridge, PLC

(57) ABSTRACT

In a power generator, a start of rotor rotation is detected by utilizing a small AC voltage in a stator winding generated by a remaining magnetic flux. A leak current which flows to the power generator from a battery is passed to a negative terminal of the battery through a resistor temporarily connected in series so that a small amplitude of the AC voltage will not be masked by DC drifting component arising from the leak current. Further, periodically connecting the resistor to the negative terminal upon an increase in the leak current reduces an amplitude of the AC voltage.

9 Claims, 5 Drawing Sheets

U.S. PATENT DOCUMENTS

| | | | |
|---|---|---|---|
| 6,469,469 B1 * | 10/2002 | Chambers et al. | 318/801 |
| 6,586,914 B2 * | 7/2003 | Garrigan et al. | 322/28 |
| 6,590,367 B2 * | 7/2003 | Kim | 323/266 |
| 6,603,097 B2 * | 8/2003 | Leisner et al. | 219/133 |
| 6,614,207 B2 * | 9/2003 | Maehara et al. | 322/28 |
| 6,624,618 B2 * | 9/2003 | Kernahan et al. | 322/90 |
| 6,628,104 B2 * | 9/2003 | Malicki et al. | 322/59 |
| 6,633,802 B2 * | 10/2003 | Sodoski et al. | 701/36 |

* cited by examiner

POWER GENERATION CONTROLLER AND METHOD FOR A VEHICLE

CROSS REFERENCE TO RELATED APPLICATION

This application is based on and incorporates herein by reference Japanese Patent Application No. 2001-1492 filed Jan. 9, 2001.

BACKGROUND OF THE INVENTION

The present invention relates to a power generation controller and method for a vehicle.

In a power generator for vehicles, it is proposed in JP-U-62-44698 to detect a start of a rotor in a power generator, which indicates a start of an engine, by utilizing small AC voltages appearing in a stator winding. Since the AC voltage generated only by a remaining magnetic flux in a field core of the rotor is very small, the small voltage cannot be detected when a DC leak current (shown with solid line in FIG. 5) flows from the higher potential side of an on-board battery to the power generator. It is difficult to detect the voltage until the rotation of the rotor becomes relatively high. It is also difficult to perform this voltage detection due to susceptibility of a contact resistance in the power generator to environmental disturbances.

In order to counter these problems caused by a leak current, detection circuits are proposed in U.S. Pat. No. 5,182,511 and No. 5,602,470 (JP-A-3-215200 and JP-A-8-503308). In these circuits, two phase voltages are detected. However, more connections between the stator winding and the detection circuit are required in these circuits, making the structure of the power generator complex and decreasing reliability.

SUMMARY OF THE INVENTION

The present invention therefore has an objective to provide a power generation controller and method for a vehicle that can maintain the accuracy of rotation detection even when a leak current occurs.

To attain this objective, a power generation controller for a vehicle controls an output voltage of the power generator by turning on and off a current supply a field winding of the power generator. The controller detects a start-up condition of power generation when the frequency of a phase voltage in the stator winding of the power generator exceeds a predetermined value. The controller temporarily connects a resistor in series between a terminal where the phase voltage is applied and a negative terminal of a battery, in response to the detection of start-up condition.

According to the present invention, even when the phase voltage increases due to occurrence of a leak current, the leak current is passed to the negative terminal of the battery via the resistor temporarily turned on. Therefore, the phase voltage with small amplitude will not be masked by DC drifting component. As a result, the accuracy of rotation detection can be maintained even when the leak current occurs.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to various embodiments in the accompanying drawings.

[First Embodiment]

Figure 1:
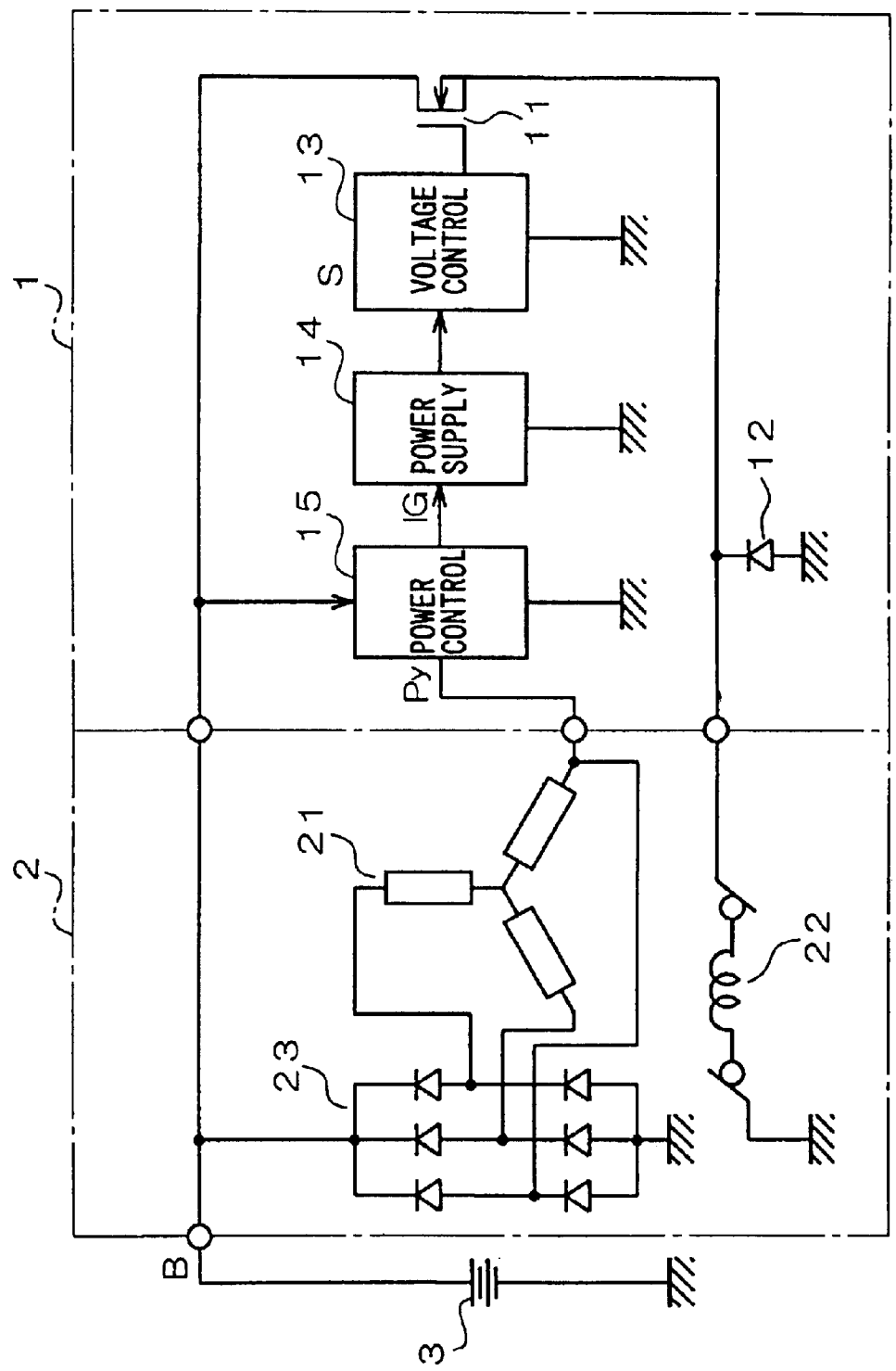
FIG. 1 is an electric wiring diagram showing a power generation controller for a vehicle according to a first embodiment of the present invention.

FIG. 1 shows a power generation controller 1 for a vehicle according to a first embodiment, as well as connections with a power generator 2 for a vehicle and a battery 3.

A power generation controller 1 controls an output voltage of a power generator 2 to be within a predetermined range. The power generator 2 comprises a three-phase stator winding 21, a field winding 22, and a full-wave rectifying circuit 23. The full-wave rectifying circuit 23 rectifies a three phase output voltages of stator winding 21. The output voltage control of this power generator 2 is performed by adjusting the field current that is fed to the field winding 22. An output terminal (B terminal) of the power generator 2 is connected to a battery 3 or other electrical loads (not shown), to which currents are fed by the power generator 2 via the B terminal.

Next, the structure of the power generation controller 1 will be discussed in detail. As shown in the FIG. 1, the power generation controller 1 comprises a power transistor 11, a flywheel diode 12, a voltage control circuit 13, a power supply circuit 14, and a power control circuit 15.

The power transistor 11 is connected in series to the field winding 22 and used as the first switching means that passes and cuts off the field current. The flywheel diode 12 is connected in parallel with the field winding 22 to flywheel the field current when the power transistor 11 is turned off. The voltage control circuit 13 controls ON/OFF condition of the power transistor 11 so that the output voltage of the power generator 2 is monitored and remains within a predetermined range. The power supply circuit 14 supplies power to maintain performance of the voltage control circuit 13. The power control circuit 15 drives the power supply circuit 14 by detecting rotations of the rotor of the power generator 2 based on one of the phase voltages of the stator winding 21 (such as a Y-phase voltage Py), namely, by detecting rotations of an engine.

Figure 2:
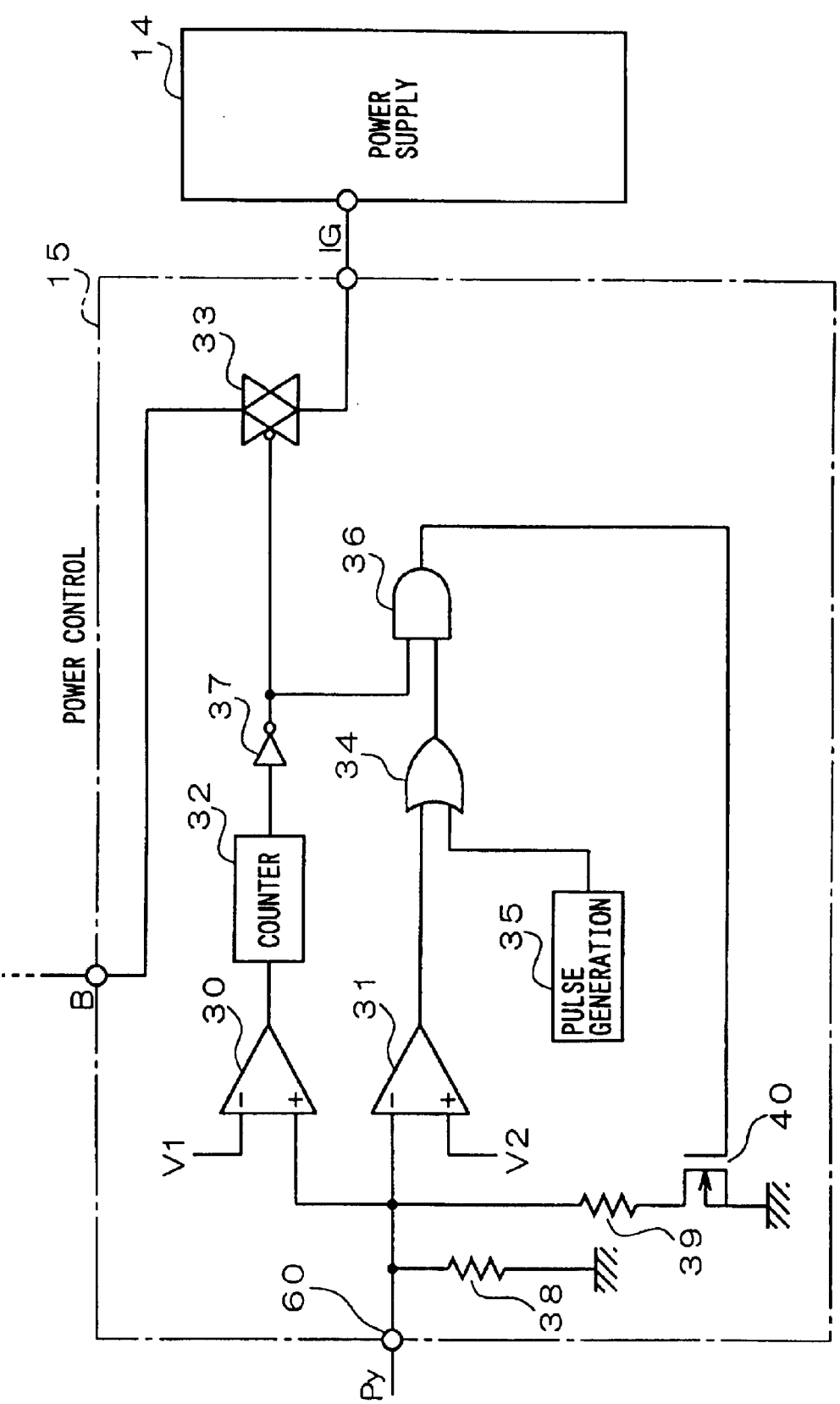
FIG. 2 is a circuit diagram showing a detailed structure of a power control circuit in the first embodiment.

As shown in the FIG. 2, the power control circuit 15 comprises voltage comparators 30 and 31, a counter circuit 32, an analog switch 33, an OR circuit 34, a pulse generation circuit 35, an AND circuit 36, an inverter circuit 37, resistors 38 and 39, and a transistor 40.

The voltage comparator 30 generates pulse signals corresponding to the number of rotations of the power generator 2. It compares the Y-phase voltage Py that is applied to an input terminal 60 with a predetermined reference voltage V1, and converts it to binary signals. The counter circuit 32 counts the number of pulse signals outputted from the voltage comparator 30. When this number reaches a predetermined value N1, it switches its output from a low level to a high level. The analog switch 33 is for applying an operating voltage IG to the power supply circuit 14. When the number of rotations of the power generator 2 has increased, the output of the counter circuit 32 becomes high. This output is inverted to low by the inverter circuit 37 and inputted to the analog switch 33. As a result, the analog switch is switched from OFF to ON, and the voltage IG is applied to the power supply circuit 14.

The transistor 40 is the second switching means to force leak current appearing in the stator winding 21 or the full-wave rectifying circuit 23 to flow into the ground. It is comprised of a MOS-type FET as an example. The resistor 39 is connected between the input terminal 60 and the transistor 40. Its resistance is smaller than that of the resistor 38, which is connected between the input terminal 60 and the ground.

The voltage comparator 31 detects a large leak current flowing into the input terminal 60 by comparing the Y-phase voltage Py that is applied to the input terminal 60 with a predetermined reference voltage V2. The predetermined reference voltage V2 and the Y-phase voltage Py that appears at the input terminal 60 are applied to the positive and negative terminals of the voltage comparator 31, respectively. When the Y-phase voltage Py reaches the reference voltage V2, the output is switched to a low level. The pulse generation circuit 35 generates pulse signals with a predetermined cycle (e.g., approximately 0.5–2 seconds).

The OR circuit 34 outputs the logical OR signal of the output signal of the voltage comparator 31 and pulse signals generated by the pulse generator 35. The output of the voltage comparator 31 will be kept at a high level until the voltage at the input terminal 60 becomes high due to the large leak current. Therefore, the output of the OR circuit 34 will be kept at the high level during this period. After the voltage at the input terminal 60 rises, and the output of the voltage comparator 31 is switched to the low level, the OR circuit 34 outputs pulse signals generated by the pulse generation circuit 35.

The AND circuit 36 outputs a logical AND signal of the output of the inverter circuit 37 and that of the OR circuit 34. The ON/OFF condition of the transistor 40 will be controlled by this output signal.

The voltage control circuit 13 corresponds to a voltage control means. The voltage comparator 30 and the counter circuit 32 correspond to a power generation detection means. The voltage comparator 31, the OR circuit 34, the pulse generation circuit 35, the AND circuit 36, and the inverter circuit 37 correspond to a switching control means.

Next, the operation of the power generation controller 1 of this embodiment will be discussed.

After a starter (not shown) is driven for starting an engine and the power generator 2 starts its rotation, the amplitude of the Y-phase voltage Py that is applied to the input terminal 60 of the power control circuit 15 gradually increases. When this amplitude of the Y-phase voltage Py becomes larger than the reference voltage V1, the voltage comparator 30 generates the predetermined signal which frequency is proportional to the number of rotations of the power generator 2, and inputs it into the counter circuit 32. When the number of pulses inputted into the counter circuit 32 during a predetermined period exceeds the predetermined value N1, in other words, the number of rotations of the power generator 2 reaches the one that corresponds to the predetermined value N1, the output of the counter circuit 32 is switched from the low level to the high level, turning on the analog switch 33. Therefore, the 20 voltage that is supplied by the battery 3 via the B-terminal of the power generator 2 is applied to the power supply circuit 14. Then, control operation of the output voltage of the power generator 2 by the voltage control circuit 13 starts.

Next, the case of leak current flowing into the stator winding 21 or the full-wave rectifying circuit 23 will be discussed.

When the power generator 2 is not generating power, the output of the counter circuit 32 is at the low level, this output signal is inverted to the high level by the inverter circuit 37 and inputted to one of the input terminals of the AND circuit 36. At this time, if the Y-phase voltage Py is smaller than the reference voltage V2, the output of the voltage comparator 31 will be at the high level. Therefore, the input terminal 60 will be grounded via the resistor 39 and the transistor 40. Thus, the leak current will be passed to the negative terminal (the ground side) of the battery 3 via these components.

If the leak current is small, the voltage drop by the resistor 39 should be small. Therefore, the voltage at the input terminal 60, which is connected to one end of the resistor 39, will be kept smaller than the reference voltage V2. The output of the AND circuit 36 will be kept at the high level, and the transistor 40 will be kept turned on. Therefore, the voltage at the input terminal 60 will be kept lower since the leak current flowing into the input terminal 60 will run into the ground via the resistor 39.

On the other hand, if the leak current is large and exceeds the reference voltage V2, the output of the voltage comparator 31 will be at the low level. Assuming that the pulse generation circuit 35 is not provided, the output of the AND circuit 36 would be at the low level and the transistor 40 would be turned off. Once the transistor 40 is turned off, it will not be turned on again as long as the voltage at the input terminal 60 remains higher than the reference voltage V2. In this case, the leak current will be passed to the negative terminal of the battery 3 via the resistor 38. Since the resistance of the resistor 38 is larger than that of the resistor 39, the Y-phase voltage appearing at the input terminal 60 will not become lower than the reference voltage V2 unless the leak current becomes smaller than several hundreds $\mu$A. Therefore, the transistor 40 will not be turned on.

Assume that the engine is started and the rotor of the power generator 2 starts rotating when the leak current has dropped to several hundreds mA and the Y-phase voltage has slightly dropped while the transistor 40 is turned off. Then, the voltage generated by a remaining magnetic flux appears. However, it will be masked by a voltage drop in the resistor 38 generated by the leak current, and, the Y-phase voltage Py appearing at the input terminal 60 cannot be converted to binary signals by the voltage comparator 30.

In order to counter this problem, the pulse generation circuit 35 is installed in this embodiment. More specifically, the OR circuit 34 is installed upstream from the AND circuit 36. The logical OR signal of the pulse signals generated by the pulse generation circuit 35 and the output signal of the voltage comparator 31 are inputted into the AND circuit 36.

Since the period of the pulse signal generated by the pulse generation circuit 35 is set to approximately 0.5–2 seconds, the output of the AND circuit 36 periodically becomes high in this period. Therefore, even when the leak current increases and the voltage at the input terminal 60 exceeds the reference voltage V2, the transistor 40 periodically turns on in the period of 0.5–2 seconds.

If the leak current has not decreased by this time, the voltage drop by the resistor 39 will be larger than the reference voltage V2 and the output of the voltage comparator 31 becomes low. As a result, the transistor 40 turns off again. If the leak current has decreased, the voltage drop by the resistor 39 will be smaller than the reference voltage V2 and the output of the voltage comparator 31 becomes high. As a result, the transistor 40 remains turned on.

Even when the leak current is generated and the voltage at the input terminal 60 exceeds the reference voltage V2, the fluctuation of the leak current can be monitored each time since the transistor 40 periodically turns on after that. Therefore, the DC drift component can be immediately decreased when the leak current is decreased. Thus, the rotation detection can be performed precisely based on the small voltage appearing at the input terminal 60.

[Second Embodiment]

Figure 3:
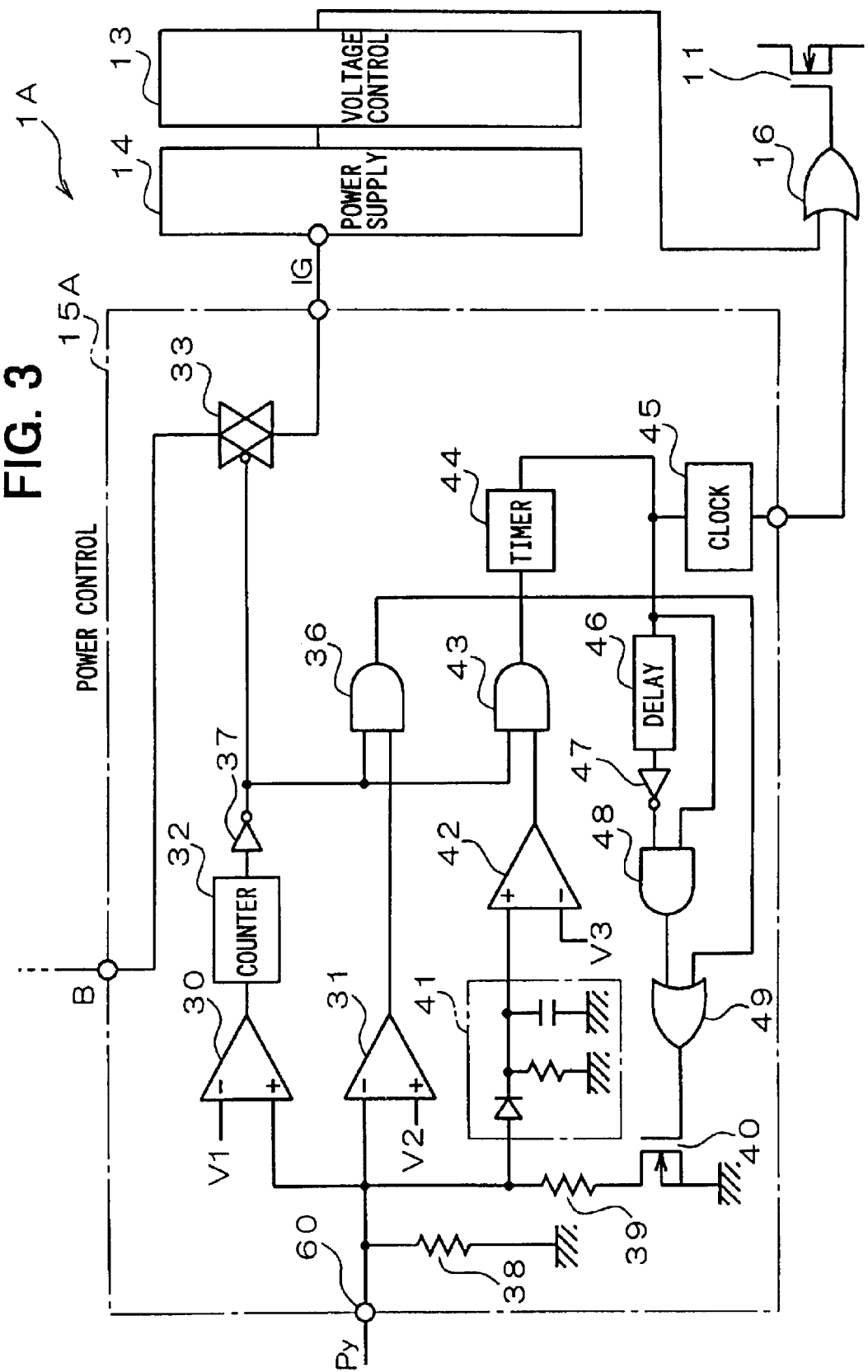
FIG. 3 is an electric wiring diagram showing a power generation controller for a vehicle according to a second embodiment of the present invention.

FIG. 3 shows a power generation controller 1A for a vehicle according to the second embodiment. Compared with a power generation controller 1 shown in FIG. 2, the power generation controller 1A has the power control 15A replaced with a power control circuit 15, and an OR circuit 16 added upstream (the gate side) from the power transistor 11. This power control circuit 15A has an OR circuit 34 and a pulse generation circuit 35 taken out while a peak detection circuit 41, a voltage comparator 42, an AND circuits 43 and 48, a timer circuit 44, a clock circuit 45, a delay circuit 46, an inverter circuit 47, and an OR circuit 49 added in order to control the ON/OFF condition of the transistor 40.

The peak detection circuit 41 is for detection of peak values of the Y-phase voltage Py that is applied to the input terminal 60. It comprises a diode, a capacitor, and a resistor. The voltage comparator 42 compares the peak value of the Y-phase voltage Py detected by the peak detection circuit 41 with a predetermined reference voltage V3. It switches its output to high when this peak value exceeds the reference voltage V3. This reference voltage V3 is set to a value smaller than the reference voltage V1 that is applied to the negative terminal of the voltage comparator 30.

The AND circuit 43 receives the output of the inverter circuit 37 and that of the voltage comparator 42. In the condition prior to power generation, the output of the counter circuit 32 is at a low level. Therefore, a high level signal from the inverter circuit 37 will be inputted to one of the input terminals of the AND circuit 43. As a result, if the peak value of the signal appearing at the input terminal 60 exceeds the reference voltage V3, a high level signal from the peak detection circuit 41 will be inputted to the other input terminal of the AND circuit 43, switching the output of the AND circuit 43 to high.

The timer circuit 44 outputs the high level signal only for the predetermined period after the output of the AND circuit 43 is switched to high. The clock circuit 45 will be in operation only during the output of the timer circuit 44 is high, and generates clock pulse signals with the predetermined duty ratio. The frequency of the clock pulse signals is set to the value significantly higher than the frequency of the pulse signals generated by the pulse generation circuit 35 used in the first embodiment. For example, it is set to the frequency of 200 Hz. These clock pulse signals are inputted to the gate of the power transistor 11 via the OR circuit 16.

The delay circuit 46 delays the output signal of the timer circuit 44 by a predetermined period. This period is set to a value longer than a cumulative turn-on time of all gate terminals connected to turn on the transistor 40 in the subsequent stage. The AND circuit 48 outputs a logical AND of the output signal of the timer circuit 44 and that of the inverter circuit 47. The OR circuit 49 receives the output signals of the AND circuits 48 and 36, and inputs the logical OR of these two signals to the gate of the transistor 40.

The voltage comparators 31 and 42, the AND circuits 36, 43, and 48, the inverter circuit 37 and 47, the peak detection circuit 41, the timer circuit 44, the clock circuit 45, the delay circuit 46, the OR circuits 49 and 16 correspond to a switching control means.

When the peak voltage appearing at the input terminal 60 of the power control circuit 15A increases and reaches the reference voltage V3, the field current is temporarily fed to the field winding 22 under the control of the power transistor 11, which is turned on and off by clock pulses generated by the clock circuit 45.

In parallel with this operation, the transistor 40 remains turned on by a high level output from the AND circuit 48 during the time corresponding to the delay time set by the delay circuit 46. This delay time is set to a value longer than a delay with which the transistor actually turns on after a command of turning it on is issued. This makes it possible to turn on the transistor 40 in contemplation of accumulated delays in various kinds of gate components of the switching control means. As a result, DC drifting component generated by the leak current can be reduced. If the voltage at the input terminal 60 exceeds the reference voltage V2 due to a leak current and a low level signal is outputted from the AND circuit 36 in spite of the fact that no power generation occurs, the transistor 40 cannot be turned on by this low level signal. However, the transistor 40 will be turned on while the output of the AND circuit 48 remains at the high level for the predetermined period. Therefore, when the transistor 40 is turned on and the leak current flows through the resistor 39 where the leak current is reduced, the transistor 40 will remain turned on until power generation starts.

If the rotation of the rotor is not detected (if the output of the counter circuit 32 is not switched to the high level) while feeding the field current by turning on and off the power transistor 11, the output of the timer circuit 44 becomes low after the predetermined period has passed returning it back to a stand-by condition. When the voltage at the input terminal 60 exceeds the reference voltage V2, the operation to feed the field current will be repeated.

Since the Y-phase voltage can be amplified by enhancing the actual magnetization of the rotor through the feeding of field current, the rotation detection using the counter circuit 32 can be performed for lower rotation ranges resulting in easier and more reliable engine start detection.

[Third Embodiment]

Figure 4:
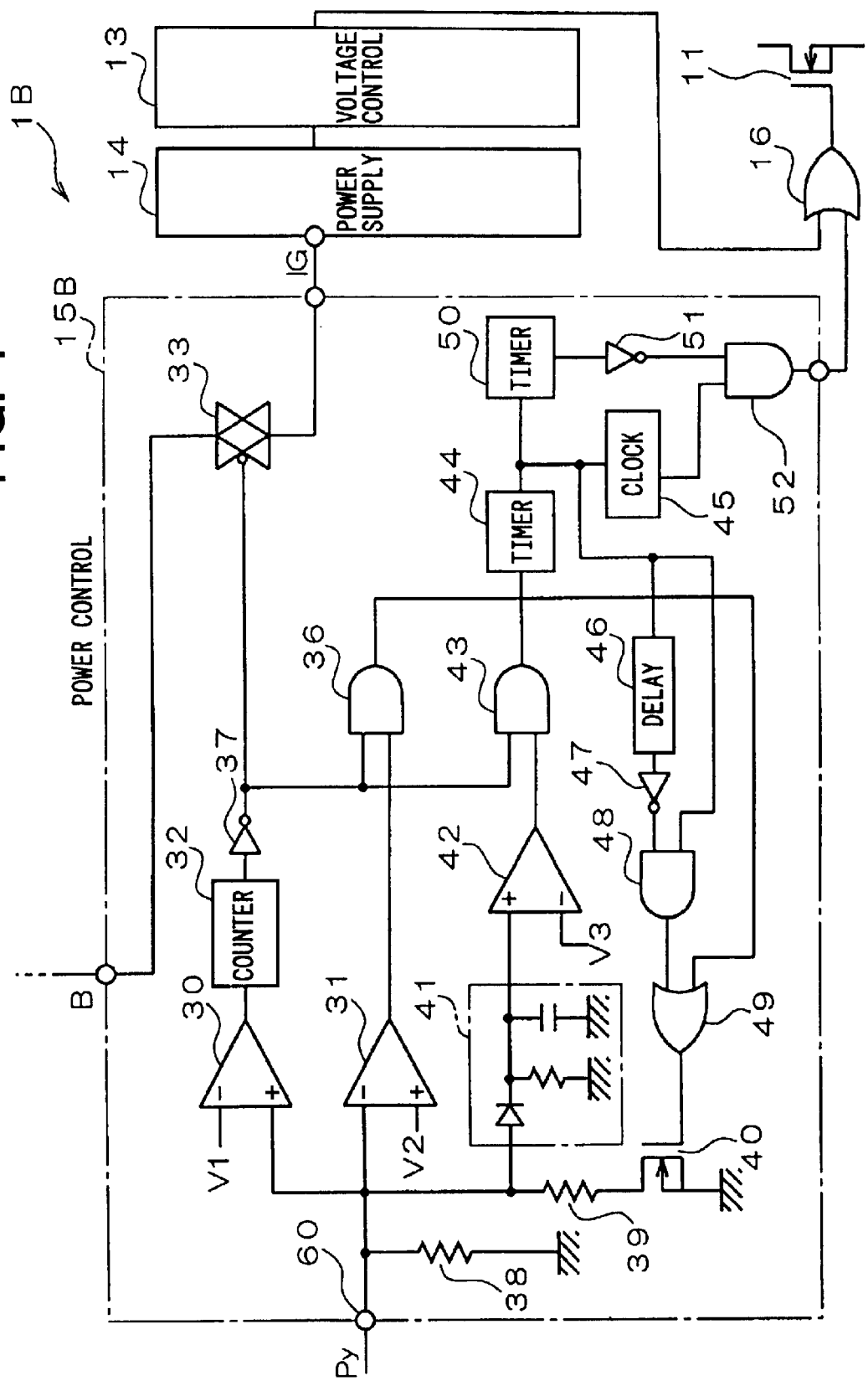
FIG. 4 is an electric wiring diagram showing a power generation controller for a vehicle according to a third embodiment of the present invention.
Figure 5:
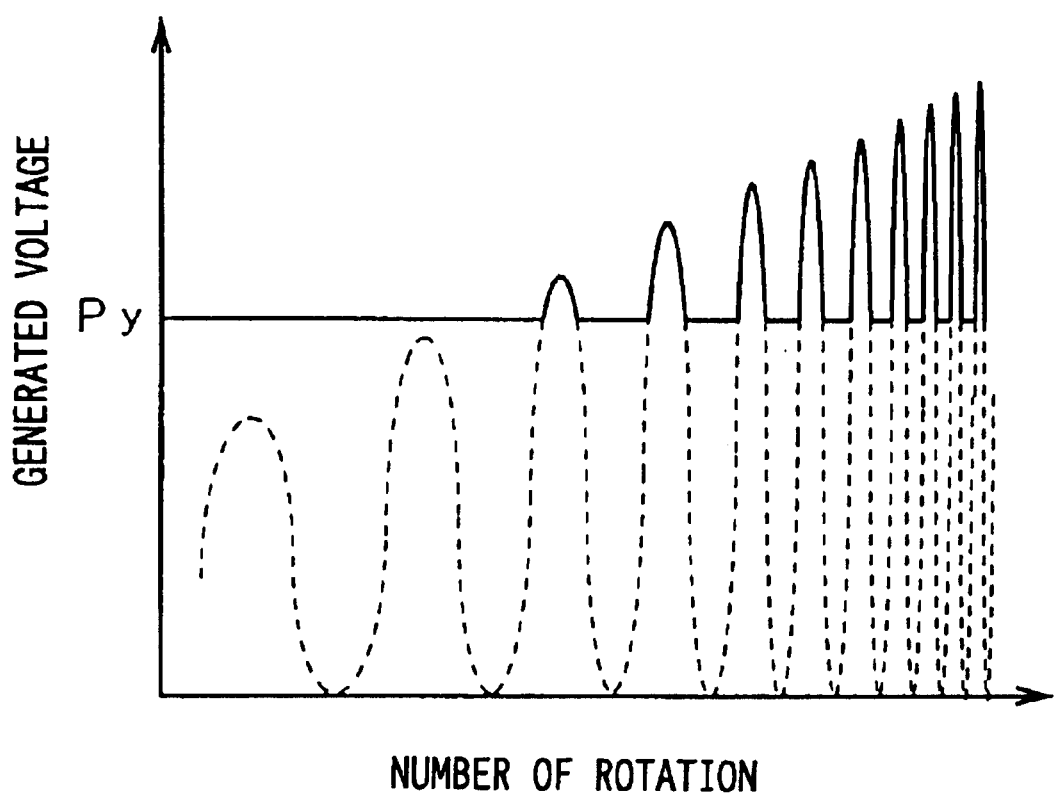
FIG. 5 is a correlation diagram showing a relationship between a drifting Y-phase voltage Py and a voltage generated by a remaining flux in a related art.

FIG. 4 shows a power generation controller 1 for a vehicle according to the third embodiment. In a power generation controller 1B shown in the FIG. 4, the power control circuit 15B in the power generation controller 1A shown in FIG. 3 is replaced with the power control circuit 15A. In this power control circuit 15B, a timer circuit 50, an inverter circuit 51, and an AND circuit 52 are added to the power control circuit 15A shown in the FIG. 3.

The timer circuit 50 maintains its output at a high level for a predetermined period after the output of the timer circuit 44 falls down. The setting time of this timer circuit 50 is set longer than the setting time of the timer circuit 44. The AND circuit 52 outputs the logical AND of the clock pulse signals outputted form the clock circuit 45 and the output of the timer circuit 50 inverted by the inverter circuit 51.

Since the timer circuit 50 stars its operation when the output of the timer circuit 44 falls down, a low level signal from the inverter circuit 51 is inputted to one of the input terminals of the AND circuit 52 for the predetermined period after the timer circuit 51 stars its operation. Therefore, when power generation has not started after a feeding of a field current, the next field current feeding will be forcefully prohibited only for the setting period of this timer circuit 50. By this operation, the field current will not be continuously fed. As a result, excessive discharge of the battery 3 can be prevented.

The voltage comparators 31 and 42, the AND circuits 36, 43, 48, and 52, the inverter circuits 37, 47, and 51, the peak detection circuit 41, the timer circuits 44 and 50, the clock circuit 45, the delay circuit 46, the OR circuits 49 and 16 correspond to the switching means.

The present invention should not be limited to the disclosed embodiments, but may be implemented in various ways without departing from the spirit of the invention.

What is claimed is:

1. A power generation controller for controlling power generation of a power generator, comprising:

voltage control means for controlling an output voltage of the power generator by turning on and off a first switching means connected in series to a field winding of the power generator;

power generation detecting means for detecting start-up conditions of power generation including a condition in which a frequency of a phase voltage of a stator winding of the power generator exceeds a predetermined reference value;

resistor and a second switching means connected in series between a terminal where the phase voltage is applied and a negative terminal of a battery; and switching control means for temporarily turning on the second switching means prior to power generation regardless of an amplitude of the voltage at the terminal.

2. A power generation controller as in claim 1, wherein the switching control means periodically turns on the second switching means when the voltage at the terminal exceeds a predetermined voltage.

3. A power generation controller as in claim 1, wherein:

the switching control means turns on the first switching means and energizes the field winding only during a period when the voltage at the terminal exceeds a predetermined voltage, which is smaller than a predetermined voltage with which the switching control means controls the second switching means; and the switching control means temporarily turns on the second switching means in step with a start of energizing the field winding.

4. A power generation controller as in claim 3, wherein the switching control means determines a second period of de-energizing the field winding after the first period of energizing the field winding.

5. A power generation controller as in claim 3, wherein the switching control means sets a period for turning on the second switching means longer than a delay with which it actually turns on after a command for turning on is issued.

6. A power generation controller as in claim 1, further comprising:

a second resistor connected in parallel with a series circuit of the resistor and the second switching means, and having a resistance larger than that of the resistor of the series circuit.

7. A power generation controller as in claim 3, wherein the switching control means detects a peak value of the voltage, and compares the peak value with the predetermined voltage for energizing the field winding.

8. A power generation control method for a power generator having a stator winding and a field winding, the method comprising the steps of:

comparing a phase voltage of the stator winding applied through a resistor with a first predetermined voltage to produce pulse signals at a frequency proportional to a rotation speed of the power generator;

comparing the phase voltage of the stator winding with a second predetermined voltage higher than the first predetermined voltage;

decreasing a resistance of the resistor as long as a number of the pulse signals is less than a predetermined number and the phase voltage is less than the second predetermined voltage, thereby reducing the phase voltage; and controlling a current supply to the field winding after the number of the pulse signals reaches the predetermined number.

9. A power generation control method for a power generator having a stator winding and a field winding, the method comprising the steps of:

comparing a phase voltage of the stator winding applied through a resistor with a first predetermined voltage to produce pulse signals at a frequency proportional to a rotation speed of the power generator;

comparing the phase voltage of the stator winding with a second predetermined voltage higher than the first predetermined voltage;

applying the phase voltage through a lower resistance resistor as long as a number of the pulse signals is less than a predetermined number and the phase voltage is less than the second predetermined voltage, thereby reducing the phase voltage; and controlling a current supply to the field winding after the number of the pulse signals reaches the predetermined number.

* * * * *